(12) United States Patent
Jadidian et al.

(10) Patent No.: US 12,327,430 B2
(45) Date of Patent: Jun. 10, 2025

(54) SIMULATED CAPACITANCE MEASUREMENTS FOR FACIAL EXPRESSION RECOGNITION TRAINING

(71) Applicant: Microsoft Technology Licensing, LLC, Redmond, WA (US)

(72) Inventors: Jouya Jadidian, Los Gatos, CA (US); Calin Cristian, Iasi (RO); Petre-Alexandru Arion, Timisoara (RO)

(73) Assignee: Microsoft Technology Licensing, LLC, Redmond, WA (US)

( * ) Notice: Subject to any disclaimer, the term of this patent is extended or adjusted under 35 U.S.C. 154(b) by 416 days.

(21) Appl. No.: 17/809,438

(22) Filed: Jun. 28, 2022

(65) Prior Publication Data
US 2023/0419722 A1 Dec. 28, 2023

(30) Foreign Application Priority Data
Jun. 24, 2022 (RO) .................................. 2022-00361

(51) Int. Cl.
*G06V 40/16* (2022.01)
*G01S 13/89* (2006.01)
(Continued)

(52) U.S. Cl.
CPC ............ *G06V 40/174* (2022.01); *G01S 13/89* (2013.01); *G06N 3/08* (2013.01); *G06V 10/82* (2022.01)

(58) Field of Classification Search
CPC ...... G06V 40/174; G06V 10/82; G06V 20/20; G01S 13/89; G01S 7/417; G06N 3/08; G06N 3/045
See application file for complete search history.

(56) References Cited

U.S. PATENT DOCUMENTS 5,012,206 A 4/1991 Tigges
9,830,507 B2 11/2017 Vetek et al.
(Continued)

FOREIGN PATENT DOCUMENTS

EP 0998659 A1 5/2000
WO WO-2021200503 A1 * 10/2021 ............ G06F 3/015

OTHER PUBLICATIONS

Kopaczka et al., An Automated Method for Realistic Face Simulation and Facial Landmark Annotation and its Application to Active Appearance Models, Dec. 2016, IEEE 2016 Sixth International Conference on Image Processing Theory) (Year: 2016).*
(Continued)

*Primary Examiner* — Said M Elnoubi
(74) *Attorney, Agent, or Firm* — Alleman Hall & Tuttle LLP

(57) ABSTRACT

A method for training a neural network for facial expression recognition includes recognizing a plurality of digital human face models. For each of the plurality of digital human face models, a plurality of simulated facial expressions are simulated. Simulated capacitance measurements for an array of simulated radio frequency (RF) antennas are found for each of the plurality of simulated facial expressions. The simulated capacitance measurements for each simulated facial expression are provided as input training data to a neural network configured to output facial expression parameters based on input capacitance measurements.

20 Claims, 12 Drawing Sheets

(51) Int. Cl.
*G06N 3/08* (2023.01)
*G06V 10/82* (2022.01)

(56) References Cited

U.S. PATENT DOCUMENTS

| 2009/0219039 | A1  | 9/2009  | Fasshauer |            |
|--------------|-----|---------|-----------|------------|
| 2019/0212822 | A1  | 7/2019  | Keller et al. |        |
| 2022/0318479 | A1* | 10/2022 | Elsewefy  | G06F 30/398 |
| 2023/0162531 | A1* | 5/2023  | Jadidian  | G06T 13/40 |
|              |     |         |           | 382/159    |
| 2024/0312095 | A1* | 9/2024  | Wei       | G06N 3/09  |

OTHER PUBLICATIONS

"International Search Report and Written Opinion Issued in PCT Application No. PCT/US22/028879", Mailed Date: Aug. 9, 2022, 14 Pages.

Alanis, et al., "3D Gesture Recognition Through RF Sensing", In Technical Report of Microsoft, MSR-TR-2014-81, Jun. 2014, 14 Pages.

Environment, AWR Design: "Design Example: ADAS Automotive Radar System", Retrieved from: https://www.youtube.com/watch?v=oDXIJTwowaE, Sep. 19, 2018, 2 Pages.

Kopaczka, et al., "An Automated Method for Realistic Face Simulation and Facial Landmark Annotation and its Application to Active Appearance Models", In Book of Sixth International Conference on Image Processing Theory, Tools and Applications, Dec. 12, 2016, 6 Pages.

Maier, et al., "Environment Perception Simulation for Radar Stimulation in Automated Driving Function Testing", In Journal of Elektrotechnik & Informationstechnik, vol. 135, Issue 4, Jun. 28, 2018, pp. 309-315.

"International Search Report and Written Opinion Issued in PCT Application No. PCT/US23/022799", Mailed Date: Sep. 12, 2023, 16 Pages.

Simulator, Carla, "Carla Talks 2020—Sensors in CARLA", Retrieved from: https://www.youtube.com/watch?v=T8qCSet8WK0, Jun. 10, 2020, 2 Pages.

\* cited by examiner

400

```
┌─────────────────────────────────────────────────────────────┐
│      RECOGNIZE A PLURALITY OF DIGITAL HUMAN FACE MODELS     │
│                                                         402 │
└─────────────────────────────────────────────────────────────┘
                              │
                              ▼
              ┌──────────────────────────────┐
              │  FOR EACH DIGITAL HUMAN FACE │
              │            MODEL:            │
              └──────────────────────────────┘
                              │
                              ▼
┌─────────────────────────────────────────────────────────────┐
│      SIMULATE A PLURALITY OF SIMULATED FACIAL EXPRESSIONS   │
│                                                         404 │
└─────────────────────────────────────────────────────────────┘
                              │
                              ▼
┌─────────────────────────────────────────────────────────────┐
│  FOR EACH SIMULATED FACIAL EXPRESSION, FIND SIMULATED       │
│  CAPACITANCE MEASUREMENTS FOR AN ARRAY OF SIMULATED         │
│  RADIO FREQUENCY (RF) ANTENNAS                          406 │
└─────────────────────────────────────────────────────────────┘
                              │
                              ▼
┌─────────────────────────────────────────────────────────────┐
│ PROVIDE THE SIMULATED CAPACITANCE MEASUREMENTS AS INPUT     │
│ TRAINING DATA TO A NEURAL NETWORK CONFIGURED TO OUTPUT      │
│ FACIAL EXPRESSION PARAMETERS BASED ON INPUT CAPACITANCE     │
│ MEASUREMENTS                                                │
│                                                         408 │
└─────────────────────────────────────────────────────────────┘
                              │
                              ▼
┌─────────────────────────────────────────────────────────────┐
│ TRAIN THE NEURAL NETWORK TO REDUCE AN ERROR BETWEEN         │
│ OUTPUT FACIAL EXPRESSION PARAMETERS AND SIMULATED           │
│ FACIAL EXPRESSION PARAMETERS LABELING THE INPUT TRAINING    │
│ DATA                                                        │
│                                                         410 │
└─────────────────────────────────────────────────────────────┘
```

FIG. 4

SIMULATED CAPACITANCE MEASUREMENTS FOR FACIAL EXPRESSION RECOGNITION TRAINING

CROSS REFERENCE TO RELATED APPLICATIONS

This application claims priority to Romanian Patent Application Serial Number a-2022-00361, filed Jun. 24, 2022, the entirety of which is hereby incorporated herein by reference for all purposes.

BACKGROUND

In some cases, a computing device may be programmed to detect and respond to movements of a human user, such as by recognizing the user's facial expressions. In particular, a wearable device equipped with suitable radio frequency (RF) antennas may generate an e-field in proximity to the user's body. While generating the e-field, electrical conditions at each RF antenna may vary depending on the distance between the RF antenna and a nearby conductive surface. For instance, the capacitance between the RF antenna and the user's skin may vary as the distance between them changes. This can enable the device to monitor electrical conditions at the RF antennas to detect and characterize the user's movements.

In some cases, a neural network may be used to output a predicted facial expression of a human user based at least on RF antenna capacitance measurements as input data. Due to the wide variety of facial expressions a user can make, and the wide range of diversity between the faces of different individuals, it is difficult to train a neural network for this purpose.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method for training a neural network for facial expression recognition includes recognizing a plurality of digital human face models. For each of the plurality of digital human face models, a plurality of simulated facial expressions are simulated. Simulated capacitance measurements for an array of simulated radio frequency (RF) antennas are found for each of the plurality of simulated facial expressions. The simulated capacitance measurements for each simulated facial expression are provided as input training data to a neural network configured to output facial expression parameters based on input capacitance measurements.

BRIEF DESCRIPTION OF THE DRAWINGS

FIG. 4 illustrates an example method for training a neural network for facial expression recognition.

DETAILED DESCRIPTION

Figure 1:
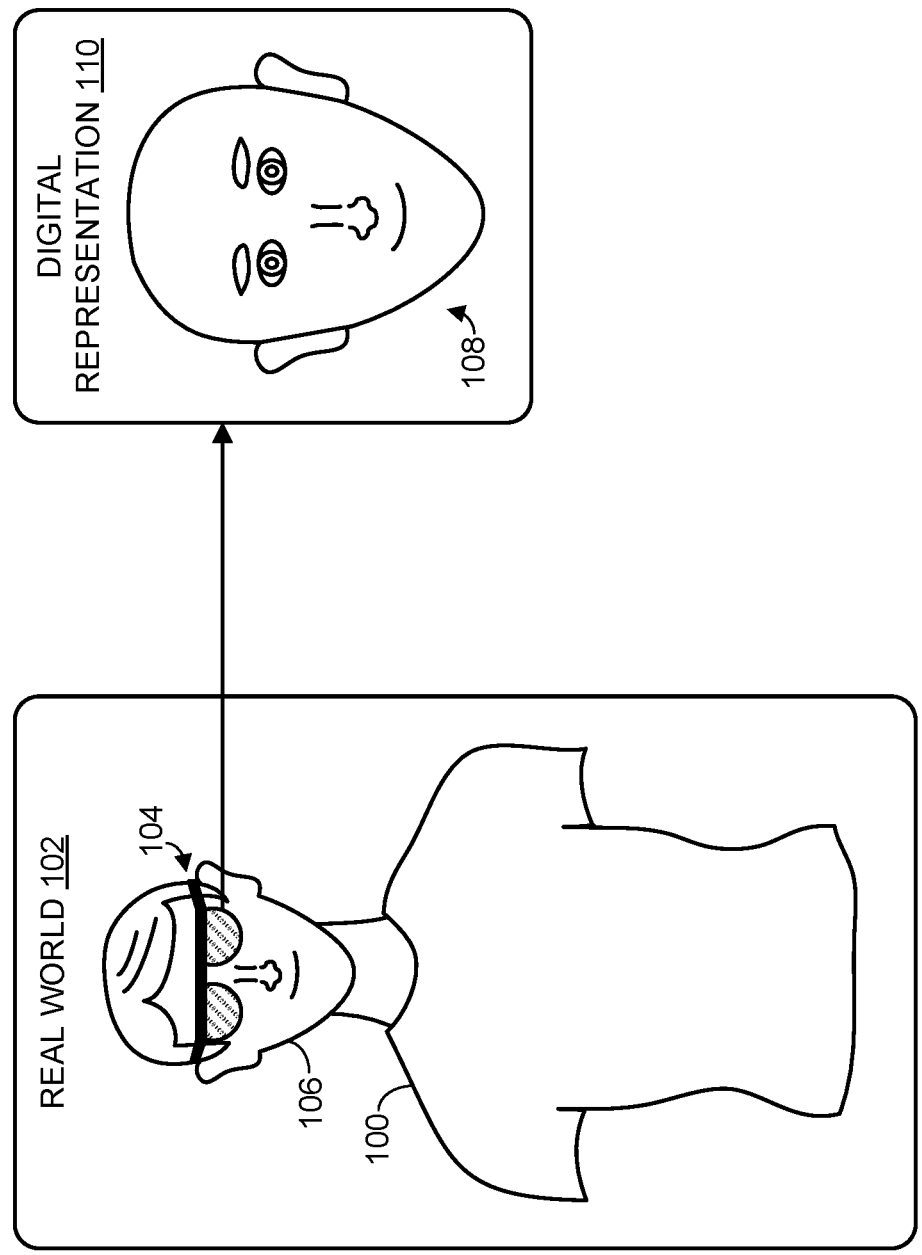
FIG. 1 schematically illustrates recognizing the facial expression of a human user.

A computing device may detect movement of a human user in various ways. In some examples, a computing device may include or interface with one or more radio frequency (RF) antennas configured to expose a body surface of the human user to an e-field—e.g., by driving the RF antennas with a high frequency alternating current. In this manner, the computing device may obtain information regarding the position and/or movements of the user's body, as electrical conditions at each RF antenna can vary based at least on the proximity between the RF antenna and the user. This may beneficially enable detection and classification of specific movements of the user's body, such as specific facial expressions, in a manner that is beneficially agnostic to different skin tones, skeletal structures, and ambient lighting conditions.

More particularly, an array of RF antennas in proximity to a user's face (e.g., integrated into a head-wearable device, such as a head-mounted display) may be used to recognize the user's current facial expression. For instance, as part of a user's face moves (e.g., lips, nose, cheeks, eyebrows, eyelids), the capacitance between the user's skin and a nearby RF antenna of the device may change. As such, a computing system may implement a neural network configured to output predictions about the user's facial expression, based at least in part on input capacitance measurements corresponding to different RF antennas. However, it can be prohibitively difficult to obtain a suitable input training set for training the neural network, due to the diverse range of expressions a human face can form, and due to the wide range of diversity between different individual faces.

Accordingly, the present disclosure is directed to techniques for training a neural network for human facial recognition using input training data generated by simulated RF antennas and simulated digital human face models. More particularly, for each of a plurality of digital human face models, a computing system simulates a plurality of different facial expressions, and then simulates interactions between the digital human face model and an array of simulated RF antennas. In this manner, the computing system generates sets of simulated capacitance measurements corresponding to the simulated RF antennas, which can be used as input training data for training a neural network. The trained neural network can then be used to predict the facial expressions of real-world human users based on measurements from real-world RF antennas.

By using a wide variety of different digital human face models, and simulating a wide variety of different facial expressions for each model, the system can beneficially generate simulated capacitance measurements that are more representative of the diversity exhibited by real-world human users. This may have the technical effect of improving human-computer interaction, as devices implementing the trained neural network may more accurately predict the facial expressions of real human users. Furthermore, the techniques described herein may beneficially reduce the associated costs of training a neural network to accurately predict human facial expressions, by allowing training data to be generated more quickly and by reducing manual effort on the part of human developers.

The techniques described herein may preserve the privacy of individual human users, as the neural network may beneficially be trained using little to no input training data that is generated from real humans. Furthermore, use of the trained neural network at runtime to predict the facial expressions of real human users may beneficially preserve user privacy, as the capacitance values measured for real RF antennas may lack the specificity required to uniquely identify real humans. In other words, while the collected capacitance measurements are useable to predict the facial expression of a human user, they generally do not provide sufficient detail to accurately distinguish any particular human from other humans that may have similar facial features.

FIG. 1 schematically illustrates an example scenario in which the facial expression of a real-world human user is recognized. Specifically, FIG. 1 shows a human user 100 in a real-world environment 102. The user is wearing a head-wearable device 104, which is configured to collect data relating to the user's face 106. Such data is useable to output a predicted facial expression 108 of the user, shown in FIG. 1 as being applied to a digital representation 110 of the user's face. For example, as will be described in more detail below, head-wearable device 104 may include a plurality of RF antennas configured to expose the surface of the user's face to an e-field. By monitoring electrical conditions at each of the plurality of RF antennas, the device may assess the positions and/or movements of different aspects of the user's face, enabling the user's facial expression to be predicted.

Head-wearable device 104 may, for example, take the form of a head-mounted display device configured to present augmented and/or virtual reality experiences to the user's eyes. Thus, the head-wearable device may in some cases include one or more near-eye displays configured to present computer-generated imagery to the user. It will be understood, however, that head-wearable device 104 is a non-limiting example. In general, any suitable computing device may be used to collect data useable for predicting the facial expression of a human user, provided that the computing device includes or interfaces with a suitable set of RF antennas. Such a device may have any suitable capabilities, hardware configuration, and form factor. For instance, head-wearable device 104 may in some cases be implemented as computing system 1200 described below with respect to FIG. 12.

Furthermore, it will be understood that a user's facial expression may in some cases be predicted by one or more computing devices other than the device that actually monitors electrical conditions at the RF antennas. For example, head-wearable device 104 may collect capacitance measurements for on-board RF antennas, then transmit such measurements to one or more other computing devices (e.g., a local computer and/or remote server) configured to predict the user's facial expression based on the capacitance measurements. In other cases, the user's facial expression may be predicted partially or entirely by the same device that includes the RF antennas—e.g., the predicted facial expression of user 100 may be output entirely by head-wearable device 104.

In the example of FIG. 1, the predicted facial expression of the human user is shown as if applied to a digital representation 110 of a human head. Such a representation may take any suitable form. For example, digital representation 110 may be intended for graphical rendering and display to other users, such as in a shared virtual experience (e.g., teleconference, video game). For example, as the facial expression of the real-world human changes, the rendered representation of the human may be updated substantially in real-time, improving the immersion of the user and/or any other users in the virtual experience. In such cases, the digital representation may be specifically generated to resemble human user 100—e.g., based on real-world images captured of the human user. Alternatively, the digital representation need not resemble the human user, but rather may have any other suitable appearance, such as a generic human representation, a representation created by the user, a cartoonish or non-human appearance, etc.

Furthermore, it will be understood that the predicted facial expression of a human user need not be graphically rendered or displayed at all. Rather, the predicted facial expression of a human user may be expressed as any suitable computer data structure and used for any number of suitable purposes besides representing the human user in a virtual experience. As one example, a human user may provide inputs to a computing device using facial expressions (e.g., winking to control a software application). Thus, it may be beneficial to collect data useable to predict the facial expression of a human user, even if the predicted facial expression is not displayed.

Figure 2:
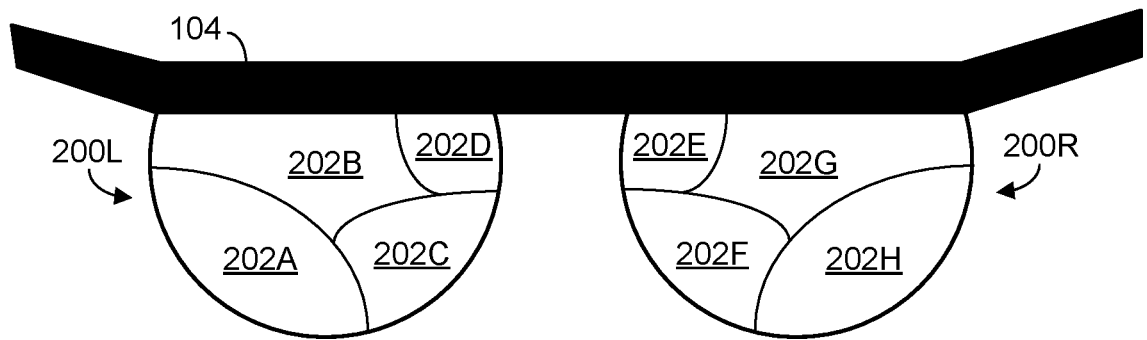
FIG. 2 schematically shows an example head-wearable device.

FIG. 2 schematically shows head-wearable device 104 in more detail. In this case, the head-wearable device has a similar form factor to a pair of eyeglasses, having a wearable frame, a left eyepiece 200L, and a right eyepiece 200R. As discussed above, the head-wearable device may in some cases be implemented as a head-mounted display device, and thus either or both of the left and right eyepieces may in some cases be configured to present computer-generated imagery to a user's eyes—e.g., as part of a virtual or augmented reality experience.

However, it will be understood that head-wearable device 104 is a non-limiting example. For instance, an alternate head-wearable device may have a form factor similar to a pair of goggles (e.g., secured by a strap around the user's head), or a helmet equipped with a visor. Furthermore, it will be understood that a head-wearable device need not include any display componentry, and need not include any components disposed in front of a user's eyes. Rather, any suitable electronic device including suitable RF antennas may be used to collect capacitance measurements for the RF antennas indicative of a user's facial expression, regardless of the specific form factor of the device, and regardless of which other functions the device may perform. For example, such a device need not have a form factor that is wearable on a human head.

In FIG. 2, head-wearable device 104 includes a plurality of RF antennas 202A-202H disposed along the left and right eyepieces. It will be understood that the specific arrangement shown in FIG. 2 is non-limiting. Rather, a device may include and/or interface with any suitable number of RF antennas. The plurality of RF antennas may each have any suitable positions relative to one another, the computing device, and the human user.

The RF antennas may be implemented using any suitable hardware. As one example, the RF antennas may be implemented as transparent glass antennas, which may beneficially enable the RF antennas to be integrated into a near-eye display. In other examples, however, the RF antennas may be constructed from any suitable non-transparent materials. In general, the RF antennas may have any suitable appearance, and may or may not be visible to the human user and/or an outside observer.

As will be described in more detail below, any or all of the plurality of RF antennas may be driven to influence electrical conditions in the vicinity of a human user. Each individual RF antenna may in some cases expose a different part of the human user's body surface to an e-field. For example, one or more RF antennas may generate an e-field in the vicinity of the user's eyes, while one or more other RF antennas generate an e-field in the vicinity of the nose, and so on to achieve a desired coverage of the user's face. This may enable the computing device to detect movements of the user's face, and thereby recognize the user's facial expression.

For example, as human skin is conductive, proximity of the conductive human skin in a near-field region relative to the plurality of RF antennas may disturb an e-field generated by driving the plurality of RF antennas with drive signals, thereby influencing characteristics of the circuitry at one or more of the plurality of RF antennas. In particular, movement of conductive skin near an RF antenna (e.g., caused by movement of muscles under the skin) may affect the impedance at the RF antenna in a measurable way—e.g., measurable as a change in voltage at the RF antenna. In this manner, detected changes in electrical conditions at the plurality of RF antennas from one time frame to another may be used to evaluate movements of the human user between the two time frames. In particular, movement of the human user may change characteristics of a circuit that the user is also part of. The system may be described as an oscillator having a resonant frequency that is sensitive to changes in parasitic capacitance. In other words, the change in frequency of the oscillator may be caused by a change in capacitive loading at the user's body surface, and this may be affected by movements of the user. Detected changes in electrical conditions at any of the RF antennas (e.g., a change in voltage) may therefore be used to calculate a capacitance between the RF antenna and the user's skin—e.g., according to Maxwell's equations.

Figure 3:
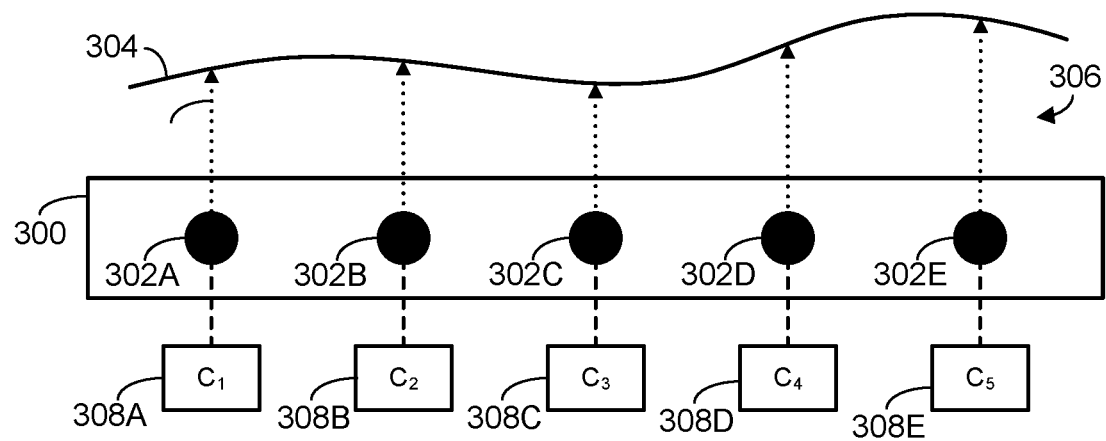
FIG. 3 schematically illustrates measuring the capacitance between radio frequency (RF) antennas and the skin of a human user.

This is schematically illustrated with respect to FIG. 3, which shows an example computing device 300 that includes a plurality of RF antennas 302A-302E. Each of the plurality of RF antennas is exposing a part of a human user 304 to an e-field 306. In FIG. 3, the part of the human user 304 generically represents any suitable part of a human user's body (e.g., the user's face). The computing device collects capacitance measurements 308A-308E for each of the plurality of RF antennas. It will be understood that the capacitance measurements may be determined or calculated in any suitable way, and derived from any suitable raw data measured from the RF antennas—e.g., changes in voltage, current, amplitude, and/or signal phase.

Furthermore, the drive signals applied to the plurality of RF antennas to generate the e-field may have any suitable characteristics. In some cases, the plurality of RF antennas may each be driven to generate the e-field using drive signals having a same voltage and phase. In other examples, however, drive signals having different voltage and/or phase may be applied to two or more of the plurality of RF antennas.

It will be understood that the specific frequencies used to drive the RF antennas, and the electrical characteristics of the larger circuit as a whole, may be tuned to achieve a desired level of sensitivity and power draw. Specifically, an RF antenna exposing conductive human skin to an e-field may cause capacitive loading of the human skin. This may result in flow of complex or real current between the RF antenna and human user depending on the specific circuit design, the frequency of the drive signal, and the proximity of the human skin.

In particular, operation of the system may be characterized by different signal response curves corresponding to capacitive, inductive, and resonance modes for any particular RF antenna. The behavior of the system may transition between each of these signal response curves depending on the current amount of capacitance between the RF antenna and the human skin, influenced by the proximity of the human user to the RF antenna. The slope of each signal response curve is based at least in part on the Q-factor, where a higher Q-factor results in a steeper curve, and therefore a greater signal response for a particular change in capacitance. The circuit may beneficially be tuned such that each RF antenna primarily operates in the capacitive mode, which is characterized by relatively low power draw as compared to the resonance and inductive modes. However, as the distance between the RF antenna and human skin changes, a relatively large change in signal may be observed as the circuit transitions from the capacitive curve to the resonance curve, enabling the movement of the human user to be detected with a relatively high confidence.

In any case, as described above, capacitance measurements collected for a plurality of RF antennas may be used to predict the facial expression of the human user. To this end, a computing system may implement a neural network configured to output predicted facial expression parameters based on input capacitance measurements. However, it can be prohibitively difficult to obtain a suitable input training set for training the neural network, due to the diverse range of expressions a human face can form, and due to the wide range of diversity between different individual faces.

Accordingly, FIG. 4 illustrates an example method 400 for training a neural network for facial expression recognition. Method 400 may be implemented by any suitable computing system of one or more computing devices—e.g., head-wearable device 104. Any computing device(s) implementing method 400 may have any suitable capabilities, hardware configuration, and form factor. In some cases, steps of method 400 may be distributed between two or more devices of a distributed computing system—e.g., via a client/server model. Any or all steps of method 400 may be repeated or looped at any suitable time and for any suitable reason. In some examples, method 400 may be implemented by computing system 1200 described below with respect to FIG. 12.

At 402, method 400 includes recognizing a plurality of digital human face models. In general, a "digital human face model" refers to any suitable computer data structure that represents the three-dimensional shape of a human face. For example, a digital human face model may be encoded using any suitable file format for three-dimensional models. "Recognizing" the plurality of digital human face models may generally refer to loading the digital human face models into computer memory of one or more different computing devices. For instance, the digital human face models may be accessed from computer storage, received from an external source (e.g., transmitted by another party, loaded from a database), or generated on-the-fly. As used herein, "recognizing" may also include the act of generating the human face model using a computer simulator, for example a three-dimensional modeling application that outputs a data structure representing the three-dimensional shape of a human face.

Figure 5:
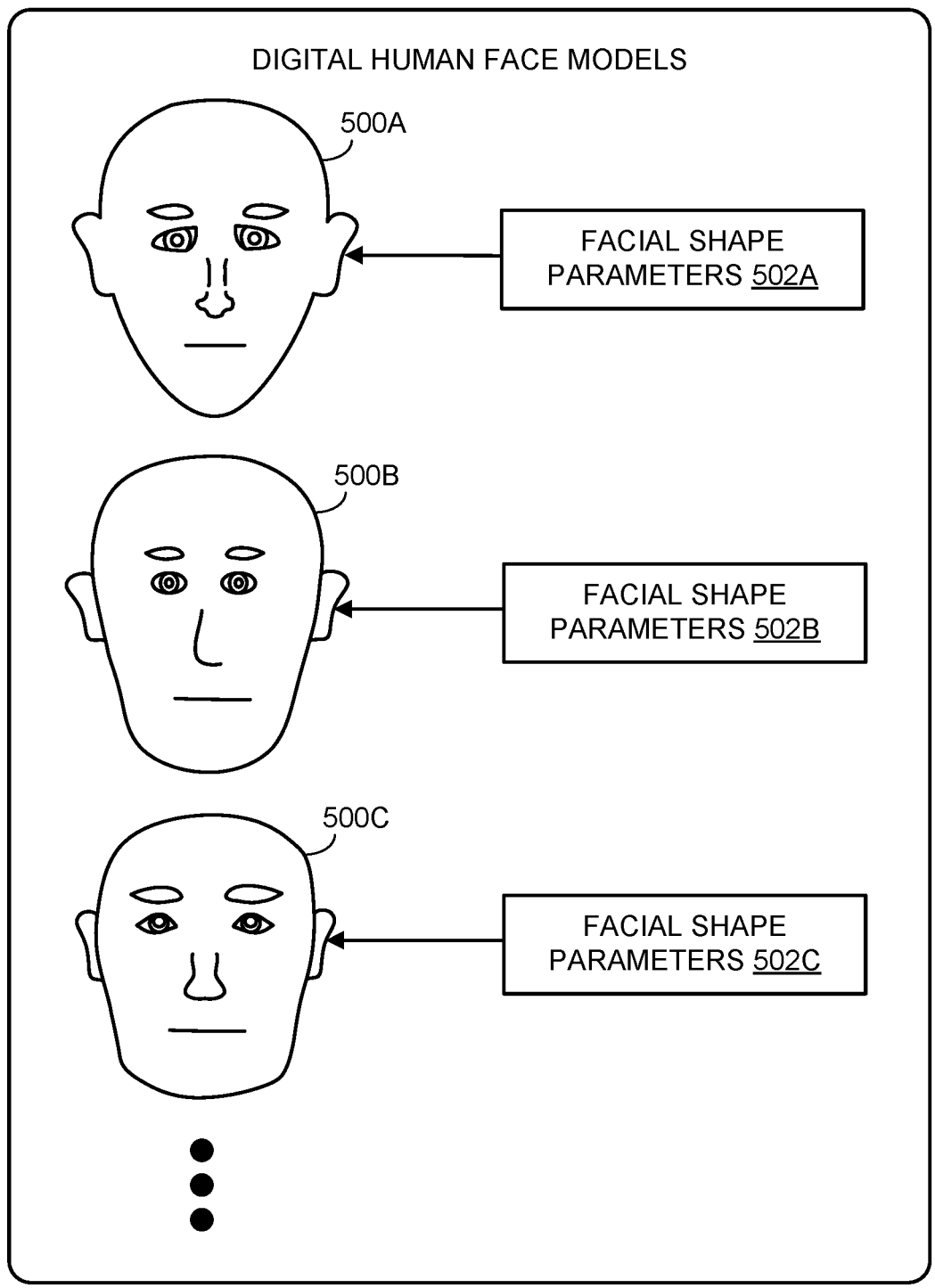
FIG. 5 schematically depicts a plurality of digital human face models.

FIG. 5 schematically illustrates a plurality of digital human face models, including models 500A-C. It will be understood that the plurality of digital human face models may include any suitable number of models, including more than three models. Each digital human face model may differ according to one or more facial shape parameters, which may define positions and/or sizes of anatomical features of each digital human face model. More particularly, facial shape parameters may define the shape, size, position, and general appearance (e.g., skin tone) of any portion of the face model, such as the eyes, nose, lips, ears, brow, cheeks, etc. In this manner, by varying the facial shape parameters between each of the digital human face models, the plurality of digital human face models may be representative of a wide variety of different human facial appearances—e.g., consistent with different ethnic backgrounds and sexual dimorphic characteristics.

It will be understood that the facial shape parameters may be expressed using any suitable format. Generally, the facial shape parameters may be specified by the computer data structure used to encode the digital human face model—e.g., the facial shape parameters may take the form of coefficients or variables that can be altered to change the sizes/shapes/positions/appearances of portions of a human face model.

In FIG. 5, the digital human face models 500A-C are indicated by different faces having different shapes, sizes, and facial features. However, it will be understood that a digital human face model need not be graphically rendered for display. Rather, each digital human face model may be expressed as a set of computer data that can be interpreted and manipulated (e.g., to simulate various facial expressions) without being displayed for viewing by a real human user.

The digital human face models may have any suitable source. In some examples, the plurality of digital human face models may be generated based at least in part on a plurality of images of real-world human faces. For example, such images may be collected from human subjects who consent to images of their faces being used in neural network training. Additionally, or alternatively, the plurality of digital human face models may be computer-generated models that do not correspond to any real humans. For example, a human developer and/or automated software application may generate digital human face models—e.g., by starting with one or more base models, and altering the facial shape parameters for the one or more base models in a random or targeted manner. In cases where the facial shape parameters are varied randomly, anatomical constraints may be used to prevent generation of faces that would not be anatomically possible.

Figure 6:
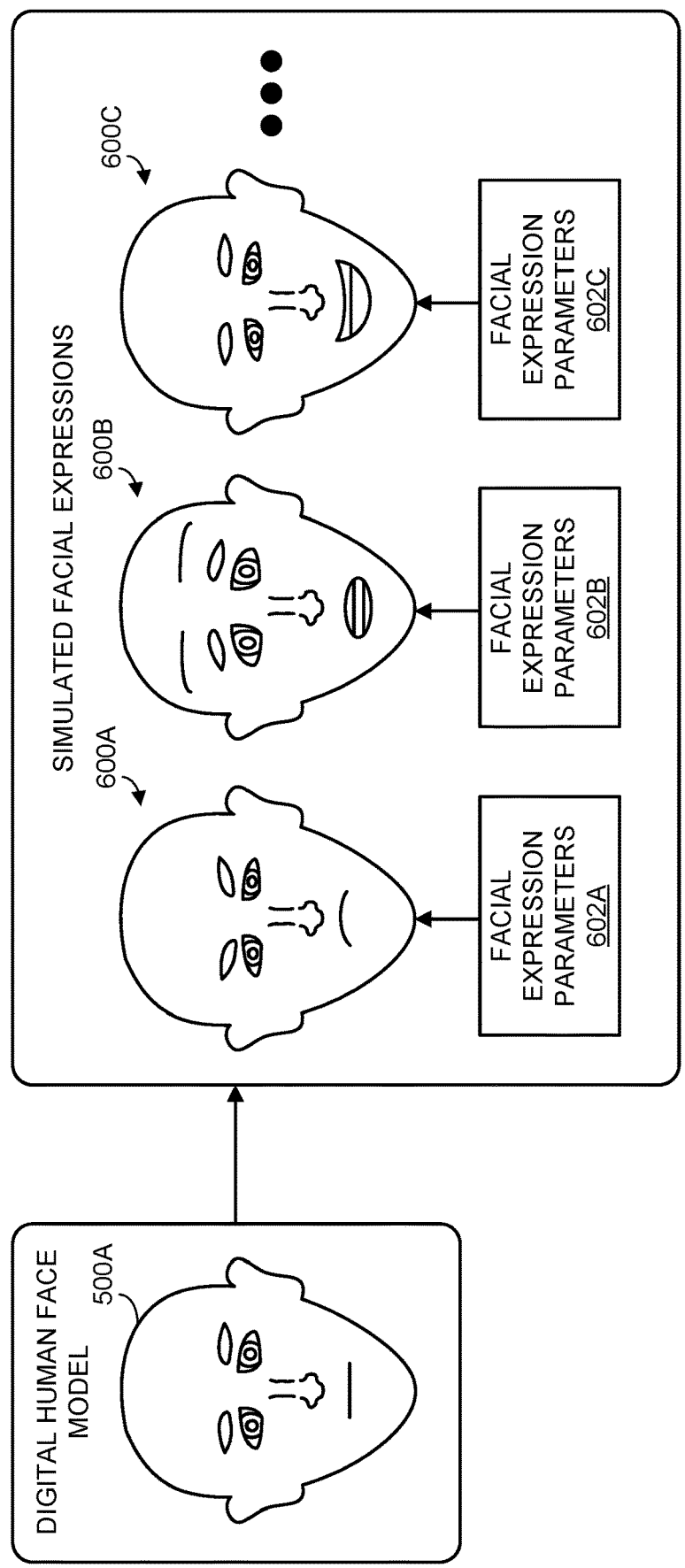
FIG. 6 schematically illustrates simulating a plurality of simulated facial expressions for a digital human face model.

Returning to FIG. 4, at 404, method 400 includes, for each of the plurality of digital human face models, simulating a plurality of simulated facial expressions. This is schematically illustrated with respect to FIG. 6. Specifically, FIG. 6 again shows digital human face model 500A, along with three simulated facial expressions 600A-600C applied to the digital human face model. It will be understood that any suitable number of different facial expressions may be simulated for each digital human face model, including more than three different expressions. As discussed above, although the different simulated facial expressions are represented in FIG. 6 by faces forming the simulated expressions, it will be understood that a "simulated facial expression" of a digital human face model may be generated and manipulated without being graphically rendered for display.

In some cases, each simulated facial expression may be encoded as a plurality of facial expression parameters. For instance, in FIG. 6, the simulated facial expressions 600A-C are encoded by facial expression parameters 602A-C. The facial expression parameters may take the form of any suitable computer data useable to expresses the facial expression applied to a digital human face model. For instance, by varying one or more of the facial expression parameters, the position or general state of one or more facial features of the digital human face model may be changed—e.g., one or more facial expression parameters may govern the position of an eyebrow of the digital human face model.

It will be understood that the specific number of facial expression parameters, as well as the specific format in which the facial expression parameters are expressed, will vary depending on the implementation. As one example, a facial expression parameter may define a movement or offset of a particular facial feature from its default or neutral position/state. For instance, one facial expression parameter may define an upwards movement of an eyebrow from its neutral position to a raised position. In some cases, the facial expression parameters may be standardized from one digital human face model to another—e.g., a given set of facial expression parameters applied to two different digital human face models may cause the two models to form relatively similar facial expressions.

The plurality of different simulated facial expressions may be simulated in any suitable way. As one example, the plurality of simulated facial expressions may be pre-defined facial expressions each having pre-defined facial expression parameters. For example, human developers may define a set of expressions to be simulated for each of the plurality of digital human face models. This can beneficially enable the developers to ensure that simulated capacitance measurements for relatively common expressions (e.g., smiling, frowning) are represented in the input training data.

Additionally, or alternatively, any or all of the plurality of simulated facial expressions may be simulated by randomly varying the facial expression parameters for the digital human face model to generate the simulated facial expressions. This may beneficially reduce manual effort on the part of the human developers, and can also increase the likelihood that relatively less common facial expressions are represented in the input training data. In some cases, the random variations applied to the facial expression parameters may be constrained by one or more anatomical constraints to avoid simulating facial expressions that would be difficult or impossible for a human face to perform. For instance, the state of one or more facial expression parameters (e.g., indicating that the face's mouth is closed) may limit the range of values that can be used for one or more other expression parameters (e.g., to prevent the tongue having a position outside of the closed mouth).

Figure 7A:
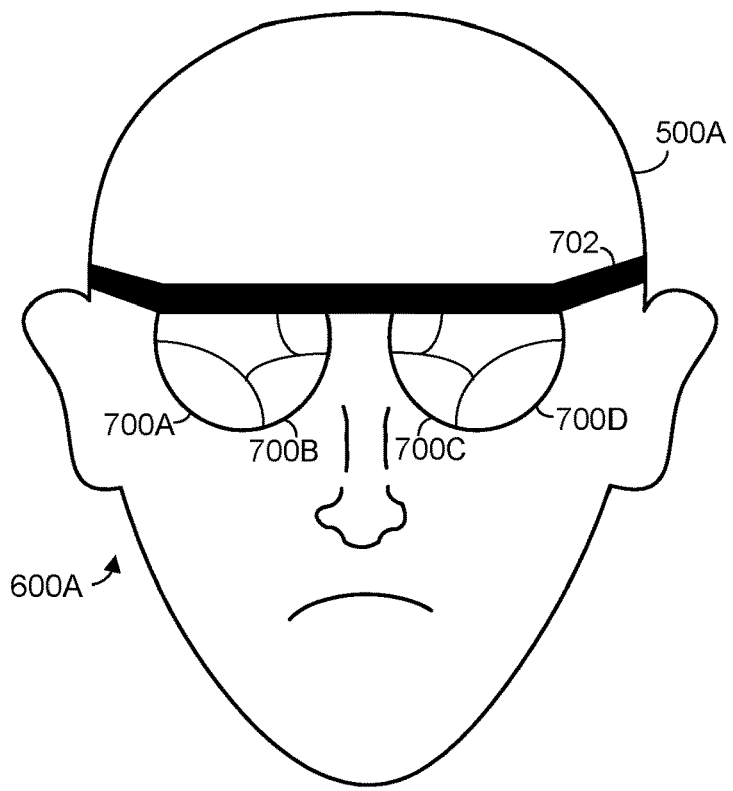
FIGS. 7A-7C schematically illustrate finding simulated capacitance measurements for an array of simulated RF antennas.

Returning briefly to FIG. 4, at 406, method 400 includes, for each of the plurality of simulated facial expressions, finding simulated capacitance measurements for an array of simulated RF antennas. This is schematically illustrated with respect to FIGS. 7A-7C. Specifically, FIG. 7A again shows simulated facial expression 600A of digital human face model 500A. FIG. 7A also shows an array of simulated RF antennas, some of which are labeled as RF antennas 700A-D. For instance, these may be simulated versions of the physical RF antennas schematically depicted in FIG. 2. As shown, the RF antennas are integrated into a simulated head-wearable device 702, which may be a simulated version of head-wearable device 104. This may enable the system to obtain simulated capacitance measurements that would be consistent with actual capacitance measurements measured by real RF antennas.

Figure 7B:
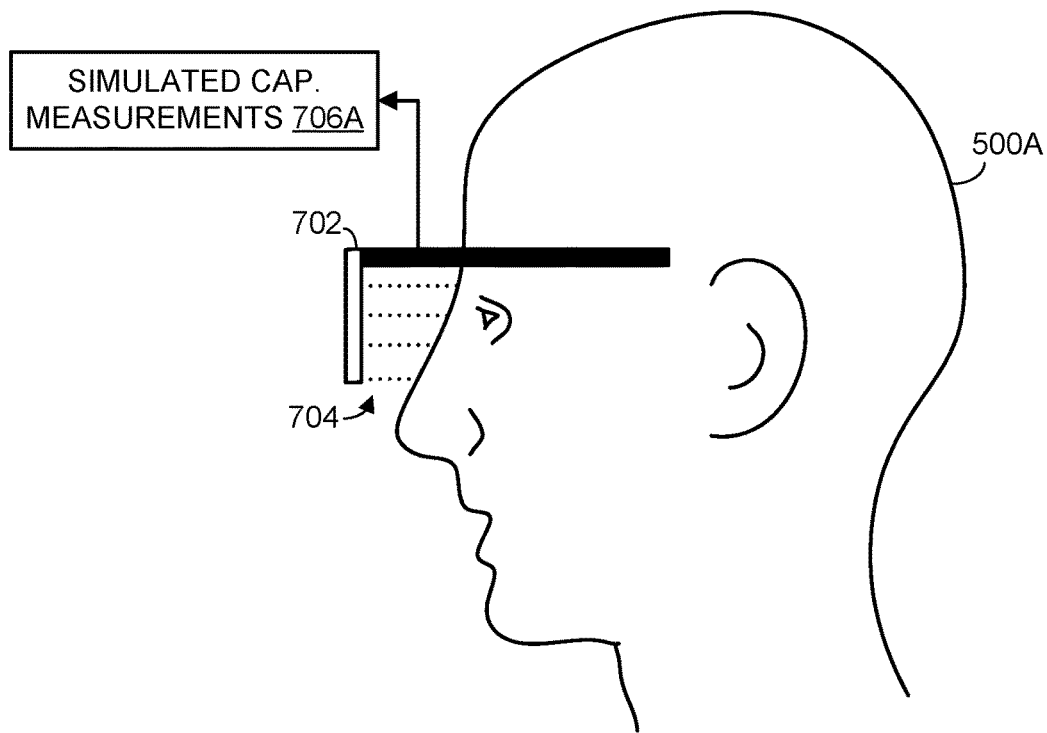
Figure 7C:
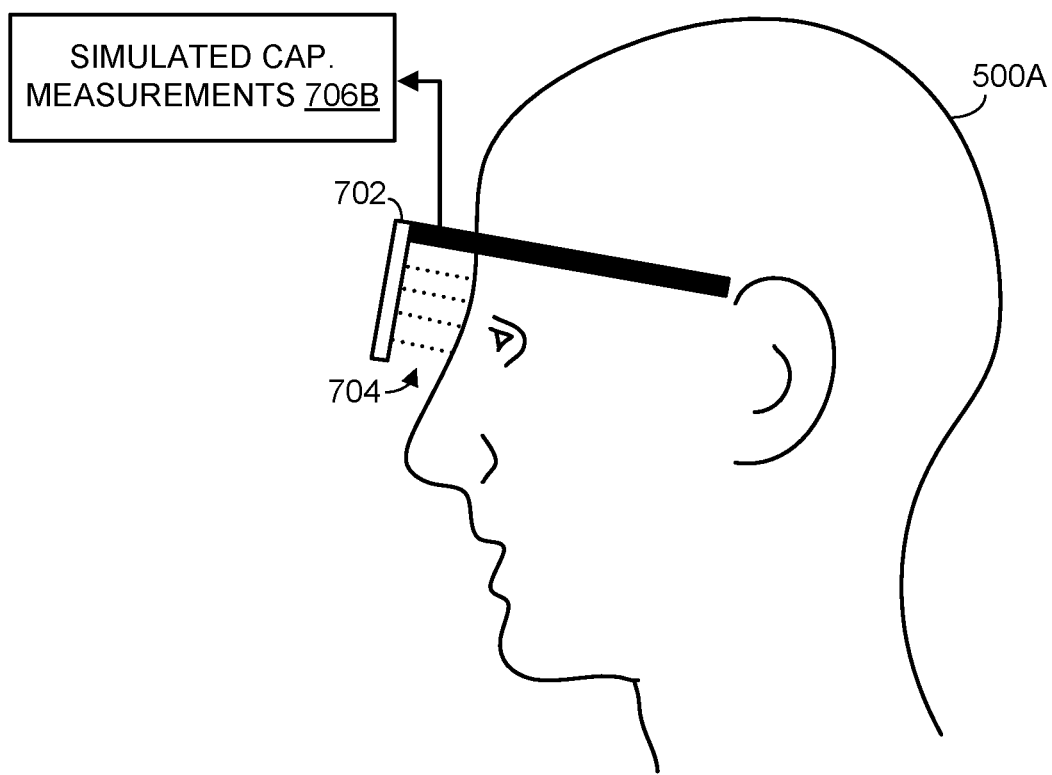

More particularly, finding the simulated capacitance measurements may include calculating the simulated capacitance measurements based at least on simulated interactions between an e-field of the simulated RF antennas and the digital human face model. This is schematically illustrated with respect to FIG. 7B, showing a side profile of digital human face model 500A. In this example, the digital human face model is an entire simulated human head, although it will be understood that this need not be the case. Rather, in some examples, the digital human face model may represent a human face while omitting other portions of the human head.

As shown in FIG. 7B, simulated RF antennas of the simulated head-wearable device are generating a simulated e-field 704 in proximity to the digital human face model 500A. Based on simulated interactions between the simulated e-field and a surface of the digital human face model, the system calculates a set of simulated capacitance measurements 706A. These simulated capacitance measurements may be calculated in any suitable way. In one example, the system may calculate the simulated capacitance measurements as though the surface of the digital human face model is a perfect electrical conductor. This may beneficially improve the robustness of the trained neural network to scenarios where the electrical conductivity of a user's body surface varies—e.g., due to ambient humidity, temperature, or weather conditions such as rainfall. In other examples, the system may simulate interactions between the e-field and one or more human tissue layers—e.g., using suitable specific absorption rate (SAR) models corresponding to human skin, fat, bone, etc. In some examples, the simulated capacitance measurements may be calculated according to Maxwell's equations.

Additionally, or alternatively, the computing system may find the simulated capacitance measurements based at least in part on a distance between each RF antenna and a surface of the digital human face model (e.g., a nearest surface to the RF antenna). For example, this may include determining the length of a ray traced from a simulated RF antenna to the surface of the digital human face model (e.g., a ray may be traced from simulated RF antenna 700A of FIG. 7A to the surface of digital human face model 500A). More particularly, a plurality of rays may be radially traced from multiple points on the surface of a simulated antenna patch. Any rays that reach a grounded geometry (e.g., surface of a face model) in less than a predetermined maximum length may be considered terminated. The calculated distances for each terminated ray may then be collected into an array for each separate antenna and aggregated into a set of scalars. It has been observed that the resulting set of values correlates strongly with simulated capacitance measurements calculated for the same geometry via simulated e-field interactions.

In some cases, for each simulated facial expression, the system may find the simulated capacitance measurements based on a simulated spatial arrangement of the array of simulated RF antennas relative to the digital human face model. For instance, this simulated spatial arrangement may be similar to the real spatial arrangement of RF antennas integrated into a physical device used to predict the facial expression of real-world human users. Furthermore, in some cases, the computing system may simulate two or more different spatial arrangements of the array of simulated RF antennas relative to the digital human face model for each simulated facial expression. For instance, when the array of simulated RF antennas is integrated into a head-wearable device (e.g., simulated device 702), simulating the two or more different spatial arrangements for the array of simulated RF antennas may include simulating two or more different positions of the head-wearable device relative to the digital human face model.

This is schematically illustrated with respect to FIG. 7C, again showing a side profile of digital human face model 500A. However, in contrast to FIG. 7B, the position of simulated head-wearable device 702 has changed. Specifically, the head-wearable device is simulated at a higher angle relative to a transverse plane through the digital human face model. The system finds another set of simulated capacitance measurements 706B for the changed position of the simulated head-wearable device. Simulating two or more different spatial arrangements of the array of RF antennas (e.g., two different positions of a head-wearable device) can improve the accuracy of the predictions output by the trained neural network. For example, two different human users may wear a head-wearable device in different positions (e.g., angled higher or lower relative to a transverse plane, positioned closer to or further from the user's eyes), depending on their head shape/size and comfort level. Furthermore, the same user may wear a head-wearable device in different positions while in use—e.g., the device may shift or tilt relative to the user's face while in use.

In addition to, or instead of, simulating different potential positions of a head-wearable device, the system may simulate different possible numbers and/or arrangements of RF antennas. For example, the computing system may generate simulated capacitance measurements corresponding to different potential versions or iterations of the physical hardware that will be used to predict the facial expressions of real human users. Different simulation passes can, for instance, cover scenarios where one particular RF antenna is bigger or smaller, has a different position with respect to the spatial array of RF antennas, or is omitted entirely. In this manner, the computing system and/or human developers may determine that some potential arrangements of RF antennas give more useful capacitance measurements, and this can guide future hardware development.

Simulating a plurality of different facial expressions for each of a plurality of digital human face models, as well as finding simulated capacitance measurements for each simulated facial expression, can include a significant expenditure of computational resources. As such, any or all of the simulation operations described herein may in some cases be distributed between two or more nodes of a distributed computing system to enable simulations to be performed in parallel. A "compute node" can refer to a distinct physical computing device, such as an individual server computer. Additionally, or alternatively, a "compute node" can refer to a logical entity, such as a virtual machine implemented on a server. Thus, a single computing device may in some cases instantiate two or more different compute nodes. In some cases, a compute node may be implemented as computing system 1200 described below with respect to FIG. 12.

Figure 8:
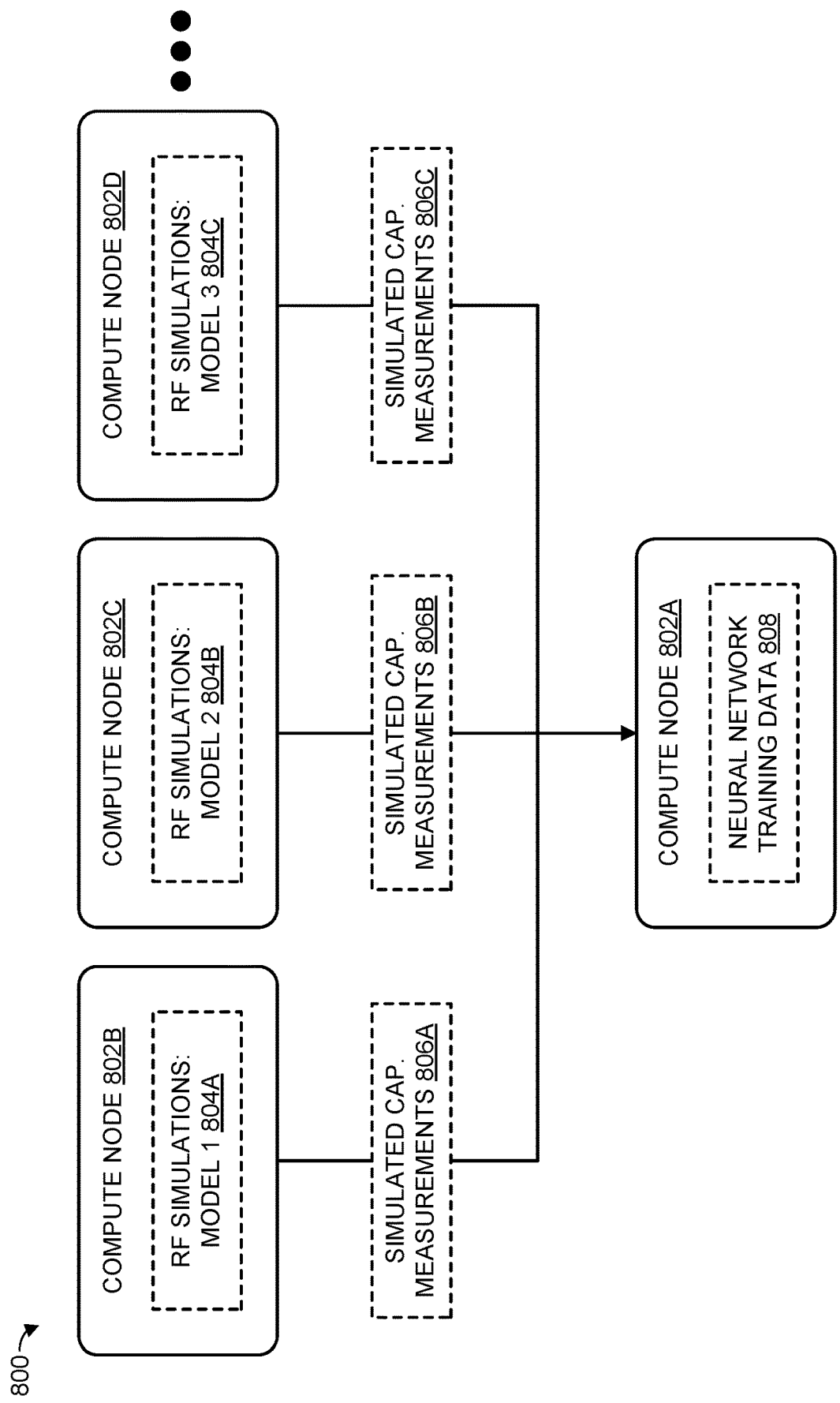
FIG. 8 schematically illustrates distributing RF simulations for different digital human face models to compute nodes of a distributed computing system.

One example distributed computing scenario is schematically illustrated with respect to FIG. 8. Specifically, FIG. 8 schematically shows a distributed computing system 800 that includes at least four compute nodes 802A-802D. It will be understood that a distributed computing system may include any suitable number of compute nodes, and can potentially include hundreds, thousands, or more different compute nodes. Furthermore, the different compute nodes may communicate over any suitable computer network—e.g., a local network or a wide-access network such as the Internet.

In the example of FIG. 8, simulations for two or more of the digital human face models are distributed between two or more different compute nodes of the distributed computing system. As shown, compute nodes 802B performs RF simulations 804A for a first digital human face model (referred to as model 1). This may include simulating a plurality of different facial expressions for the digital human face model, and finding simulated capacitance measurements for each simulated facial expression, as described above. Compute nodes 802C and 802D perform RF simulations 804B and 804C for different digital human face models (e.g., model 2 and model 3). As a result, compute nodes 802B-802D generate sets of simulated capacitance measurements 806A-806C, which are transmitted to compute node 802A. Compute node 802A may use the simulated capacitance measurements as neural network input training data 808, as will be described in more detail below. In other words, compute node 802A receives, from a plurality of compute nodes (e.g., nodes 802B-D), simulated capacitance measurements based at least on a simulated spatial arrangement of an array of simulated RF antennas relative to at least one digital human face model, the digital human face model having at least one simulated facial expression.

In the example of FIG. 8, each of compute nodes 802B-802D perform simulations for a different digital human face model. However, it will be understood that this is non-limiting. In some examples, the same compute node may perform simulations for two or more different digital human face models, and/or simulations for the same digital human face model may be performed by two or more different compute nodes.

Figure 9:
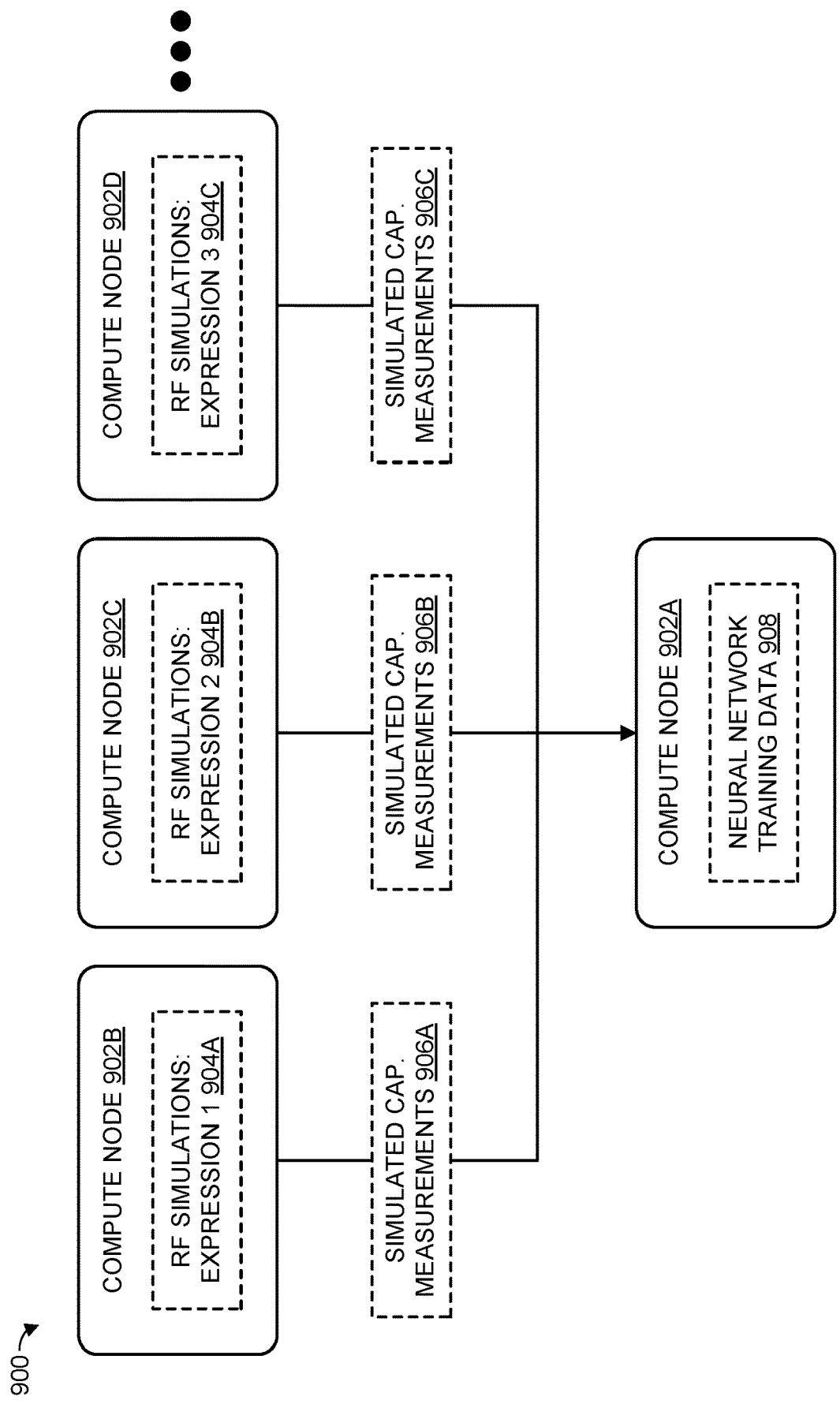
FIG. 9 schematically illustrates distributing RF simulations for different simulated facial expressions to compute nodes of a distributed computing system.

This is illustrated with respect to FIG. 9, schematically showing another example distributed computing system 900. As with system 800, system 900 includes at least four compute nodes 902A-902D. In this case, simulations for two or more different simulated facial expressions of a digital human face model are distributed between two or more compute nodes of the distributed computing system. Specifically, compute node 902B performs RF simulations 904A for a first simulated facial expression (referred to as expression 1). Compute nodes 902C and 902D perform RF simulations 904B and 904C for different simulated facial expressions (e.g., expressions 2 and 3) for the same digital human face model. As a result, compute nodes 902B-902D generate sets of simulated capacitance measurements 906A-906C, which are transmitted to compute node 902A. Compute node 902A may use the simulated capacitance measurements as neural network input training data 908, as will be described in more detail below.

Returning briefly to FIG. 4, at 408, method 400 includes providing the simulated capacitance measurements for each simulated facial expression as input training data to a neural network configured to output facial expression parameters based on input capacitance measurements. The neural network may be implemented in any suitable way, using any suitable machine learning (ML) techniques. Non-limiting examples of suitable ML technologies that may be used to implement and train the neural network will be described below with respect to FIG. 12.

Figure 10:
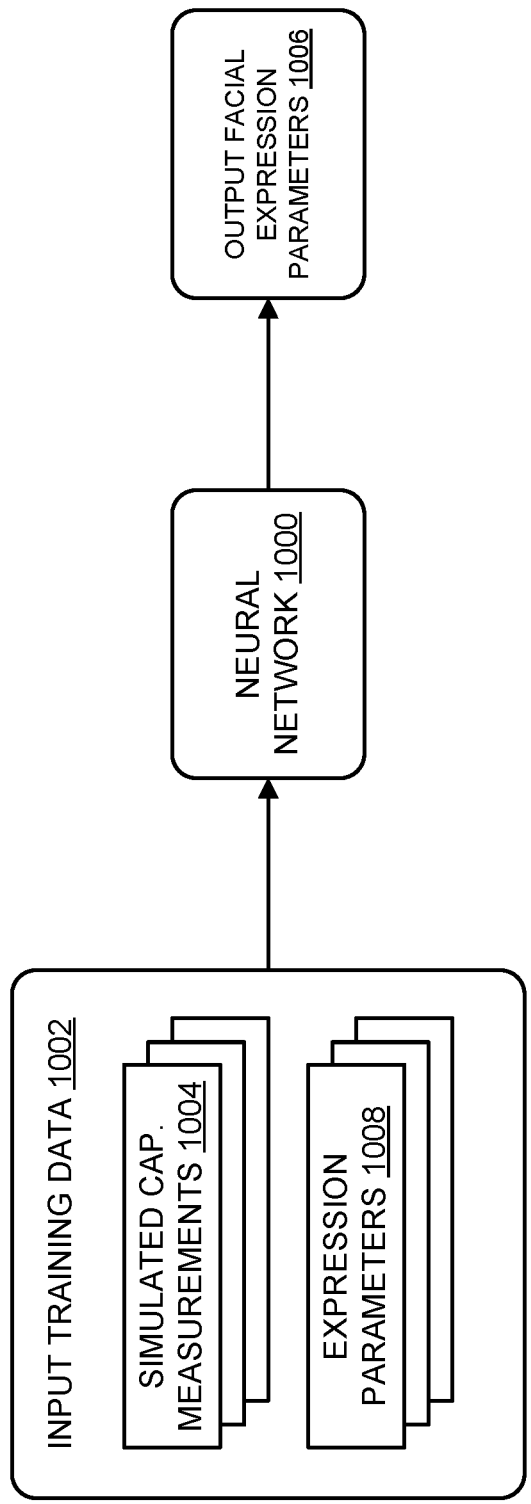
FIG. 10 schematically illustrates providing simulated capacitance measurements to a neural network as input training data.

FIG. 10 schematically illustrates providing simulated capacitance measurements to a neural network as input training data. Specifically, in FIG. 10, a neural network 1000 receives a set of input training data 1002, which includes various simulated capacitance measurements 1004. Based on such measurements, the neural network outputs predicted facial expression parameters 1006. In other words, for a given set of input capacitance measurements, the neural network may output a set of facial expression parameters predicted to be consistent with the input capacitance measurements.

In some cases, the neural network may be configured to output facial expression parameters for two or more different digital human face models of the plurality of digital human face models. Thus, the simulated capacitance measurements 1004 included in the set of input training data may include capacitance measurements simulated for two or more different digital human face models. In other examples, different neural networks may be trained to output facial expression parameters for each digital human face model of the plurality of digital human face models. For instance, neural network 1000 may correspond to one specific digital human face model (e.g., model 500A), and the simulated capacitance measurements used to train the neural network may be simulated based on that model. Other neural networks may be trained for other digital human face models.

In such cases, a real device attempting to predict the facial expression of a human user may first determine which of the plurality of different digital human face models the human user is most similar to. From there, the device may provide real capacitance measurements for the user's face to the appropriate neural network. As one example, the device may use an image of the user's face to determine which of the plurality of digital human face models is most similar to the real user's face (e.g., which of the digital human face models is the nearest neighbor to the user's face).

The neural network may be trained in any suitable way. In some cases, the simulated capacitance measurements provided as input training data may be labeled with simulated facial expression parameters for a simulated facial expression that the capacitance measurements correspond to. For instance, in the example of FIG. 7B, the computing system generates a set of simulated capacitance measurements 706A for simulated facial expression 600A of digital human face model 500B. The simulated expression parameters that encode simulated facial expression 600A may be used as ground truth labels when simulated capacitance measurements 706A are provided to the neural network as input training data.

As such, returning briefly to FIG. 4, method 400 includes, at 410, training the neural network to reduce an error between the output facial expression parameters and the simulated facial expression parameters labeling the input training data. In other words, for any given training iteration in training the neural network, a set of input capacitance measurements may result in an output set of facial expression parameters. However, after each training iteration, backpropagation may be used to adjust parameters of the neural network, such that future passes will result in output facial expression parameters that are more similar to the ground truth labels—e.g., the simulated facial expression parameters used to encode the facial expression for which the input capacitance measurements were simulated.

Figure 11:
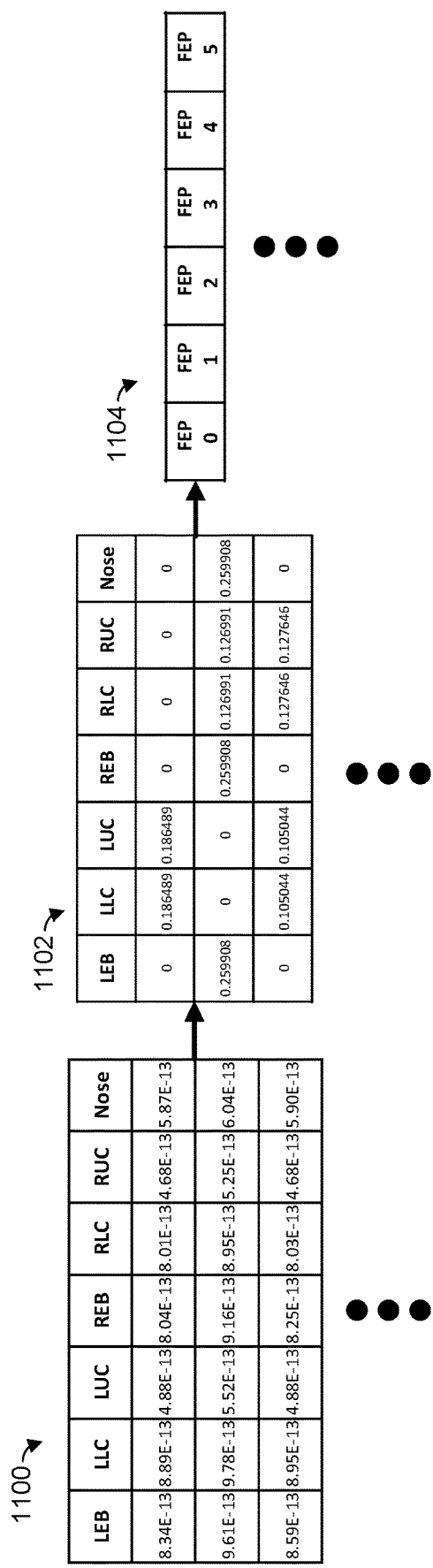
FIG. 11 schematically illustrates outputting predicted facial expression parameters based on simulated capacitance measurements.

FIG. 11 schematically illustrates the process of outputting predicted facial expression parameters given a set of input simulated capacitance measurements. As one example, the operations illustrated in FIG. 11 may be in the process of training a neural network, such as neural network 1000 in FIG. 10.

FIG. 11 shows an example set 1100 of simulated capacitance measurements simulated for various RF antennas of a simulated head-wearable device. In this example, seven simulated RF antennas are used, although it will be understood that this is non-limiting. The various simulated RF antennas may correspond to different specific regions of a human face (e.g., a digital human face model). For example, the "LEB" RF antenna may correspond to a left eyebrow of the digital human face model, while the "NOSE" RF antenna corresponds to a nose of the digital human face model, and so on.

It will be understood that the specific values shown in FIG. 11 are non-limiting, and that any number of different measurements may be simulated for each RF antenna. For example, the different rows of the set 1100 of simulated capacitance measurements may correspond to different simulated facial expressions, different simulated spatial arrangements of the plurality of RF antennas, different sequential time frames, different simulation iterations of the same scenario, etc.

In FIG. 11, min-max normalization is applied to the set 1100 of simulated capacitance measurements to give a normalized set 1102 of simulated capacitance measurements, although this is non-limiting. In general, any suitable data normalization, filtering, or other processing may optionally be applied to the set of simulated capacitance measurements.

Based at least on the normalized set 1102 of simulated capacitance measurements, the system outputs a predicted set 1104 of facial expression parameters. As discussed above, these may take any suitable form depending on the implementation. In FIG. 11 only six facial expression parameters are shown, although it will be understood that this is non-limiting. Rather, the system may output any suitable number of different facial expression parameters. In cases where multiple different simulated capacitance measurements are provided for the same RF antenna, the system may in some cases output multiple different values for each facial expression parameter.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 12:
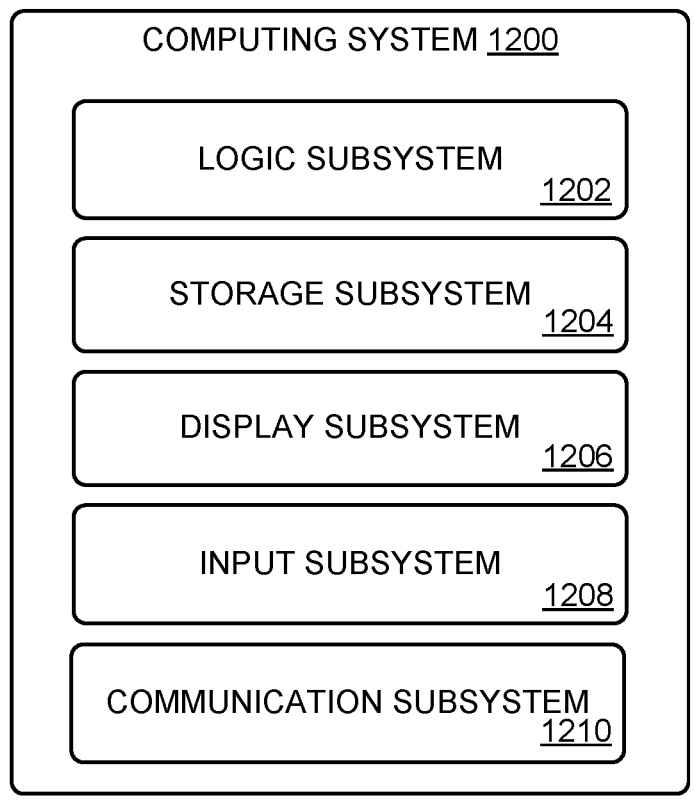
FIG. 12 schematically shows an example computing system.

FIG. 12 schematically shows a simplified representation of a computing system 1200 configured to provide any to all of the compute functionality described herein. Computing system 1200 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices.

Computing system 1200 includes a logic subsystem 1202 and a storage subsystem 1204. Computing system 1200 may optionally include a display subsystem 1206, input subsystem 1208, communication subsystem 1210, and/or other subsystems not shown in FIG. 12.

Logic subsystem 1202 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 1204 includes one or more physical devices configured to temporarily and/or permanently hold computer information such as data and instructions executable by the logic subsystem. When the storage subsystem includes two or more devices, the devices may be collocated and/or remotely located. Storage subsystem 1204 may include volatile, nonvolatile, dynamic, static, read/write, read-only, random-access, sequential-access, location-addressable, file-addressable, and/or content-addressable devices. Storage subsystem 1204 may include removable and/or built-in devices. When the logic subsystem executes instructions, the state of storage subsystem 1204 may be transformed—e.g., to hold different data.

Aspects of logic subsystem 1202 and storage subsystem 1204 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

Machines may be implemented using any suitable combination of state-of-the-art and/or future machine learning (ML), artificial intelligence (AI), and/or natural language processing (NLP) techniques. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or super-segmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

When included, display subsystem 1206 may be used to present a visual representation of data held by storage subsystem 1204. This visual representation may take the form of a graphical user interface (GUI). Display subsystem 1206 may include one or more display devices utilizing virtually any type of technology. In some implementations, display subsystem may include one or more virtual-, augmented-, or mixed reality displays.

When included, input subsystem 1208 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 1210 may be configured to communicatively couple computing system 1200 with one or more other computing devices. Communication subsystem 1210 may include wired and/or wireless communication devices compatible with one or more different communication protocols. The communication subsystem may be configured for communication via personal-, local- and/or wide-area networks.

The methods and processes disclosed herein may be configured to give users and/or any other humans control over any private and/or potentially sensitive data. Whenever data is stored, accessed, and/or processed, the data may be handled in accordance with privacy and/or security standards. When user data is collected, users or other stakeholders may designate how the data is to be used and/or stored. Whenever user data is collected for any purpose, the user data may only be collected with the utmost respect for user privacy (e.g., user data may be collected only when the user owning the data provides affirmative consent, and/or the user owning the data may be notified whenever the user data is collected). If the data is to be released for access by anyone other than the user or used for any decision-making process, the user's consent may be collected before using and/or releasing the data. Users may opt-in and/or opt-out of data collection at any time. After data has been collected, users may issue a command to delete the data, and/or restrict access to the data. All potentially sensitive data optionally may be encrypted and/or, when feasible, anonymized, to further protect user privacy. Users may designate portions of data, metadata, or statistics/results of processing data for release to other parties, e.g., for further processing. Data that is private and/or confidential may be kept completely private, e.g., only decrypted temporarily for processing, or only decrypted for processing on a user device and otherwise stored in encrypted form. Users may hold and control encryption keys for the encrypted data. Alternately or additionally, users may designate a trusted third party to hold and control encryption keys for the encrypted data, e.g., so as to provide access to the data to the user according to a suitable authentication protocol.

When the methods and processes described herein incorporate ML and/or AI components, the ML and/or AI components may make decisions based at least partially on training of the components with regard to training data. Accordingly, the ML and/or AI components may be trained on diverse, representative datasets that include sufficient relevant data for diverse users and/or populations of users. In particular, training data sets may be inclusive with regard to different human individuals and groups, so that as ML and/or AI components are trained, their performance is improved with regard to the user experience of the users and/or populations of users.

ML and/or AI components may additionally be trained to make decisions so as to minimize potential bias towards human individuals and/or groups. For example, when AI systems are used to assess any qualitative and/or quantitative information about human individuals or groups, they may be trained so as to be invariant to differences between the individuals or groups that are not intended to be measured by the qualitative and/or quantitative assessment, e.g., so that any decisions are not influenced in an unintended fashion by differences among individuals and groups.

ML and/or AI components may be designed to provide context as to how they operate, so that implementers of ML and/or AI systems can be accountable for decisions/assessments made by the systems. For example, ML and/or AI systems may be configured for replicable behavior, e.g., when they make pseudo-random decisions, random seeds may be used and recorded to enable replicating the decisions later. As another example, data used for training and/or testing ML and/or AI systems may be curated and maintained to facilitate future investigation of the behavior of the ML and/or AI systems with regard to the data. Furthermore, ML and/or AI systems may be continually monitored to identify potential bias, errors, and/or unintended outcomes.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, a method for training a neural network for facial expression recognition comprises: recognizing a plurality of digital human face models; and for each of the plurality of digital human face models: simulating a plurality of simulated facial expressions; for each of the plurality of simulated facial expressions, finding simulated capacitance measurements for an array of simulated radio frequency (RF) antennas; and providing the simulated capacitance measurements for each simulated facial expression as input training data to a neural network configured to output facial expression parameters based on input capacitance measurements. In this example or any other example, the input training data is labeled with simulated facial expression parameters for the simulated facial expression. In this example or any other example, the method further comprises training the neural network to reduce an error between the output facial expression parameters and the simulated facial expression parameters labeling the input training data. In this example or any other example, the simulated capacitance measurements are found based on a simulated spatial arrangement of the array of simulated RF antennas relative to the digital human face model with the simulated facial expression. In this example or any other example, finding the simulated capacitance measurements includes calculating the simulated capacitance measurements based at least on simulated interactions between an e-field of the simulated RF antennas and the digital human face model. In this example or any other example, the simulated capacitance measurements are calculated according to Maxwell's equations. In this example or any other example, finding the simulated capacitance measurements includes estimating each simulated capacitance measurement based at least on a length of a ray traced from a simulated RF antenna to a surface of the digital human face model. In this example or any other example, the method further comprises, for each simulated facial expression, simulating two or more different spatial arrangements for the array of simulated RF antennas relative to the digital human face model. In this example or any other example, the array of simulated RF antennas are integrated into a simulated head-wearable device, and wherein simulating the two or more different spatial arrangements for the array of simulated RF antennas includes simulating two or more different positions of the head-wearable device relative to the digital human face model. In this example or any other example, the plurality of different human face models are generated based at least on a plurality of images of real-world human faces. In this example or any other example, the plurality of simulated facial expressions are each encoded as a plurality of facial expression parameters, and wherein the plurality of simulated facial expressions are a plurality of pre-defined facial expressions each having pre-defined facial expression parameters. In this example or any other example, the plurality of simulated facial expressions are each encoded as a plurality of facial expression parameters, and wherein simulating the plurality of simulated facial expressions includes randomly varying the facial expression parameters for the digital human face model to generate each simulated facial expression. In this example or any other example, each of the plurality of digital human face models differ according to one or more facial shape parameters. In this example or any other example, the one or more facial shape parameters define positions and/or sizes of anatomical facial features of the plurality of digital human face models. In this example or any other example, different neural networks are trained to output facial expression parameters for each digital human face model of the plurality of digital human face models. In this example or any other example, the neural network is configured to output facial expression parameters for two or more digital human face models of the plurality of digital human face models. In this example or any other example, simulations for two or more of the digital human face models are distributed between two or more compute nodes of a distributed computing system. In this example or any other example, simulations for two or more different simulated facial expressions of a digital human face model are distributed between two or more compute nodes of a distributed computing system.

In an example, a computing system comprises: a communications subsystem; a logic subsystem; and a storage sub system holding instructions executable by the logic subsystem to: receive, from a plurality of compute nodes via the communications subsystem, simulated capacitance measurements based on a simulated spatial arrangement of an array of simulated radio frequency (RF) antennas relative to a digital human face model with a simulated facial expression; and provide the simulated capacitance measurements to a neural network configured to output facial expression parameters based on input capacitance measurements.

In an example, a method for training a neural network for facial expression modeling comprises: recognizing a plurality of digital human face models; and for each of the plurality of digital human face models: simulating a plurality of simulated facial expressions; for each of the plurality of simulated facial expressions, finding simulated capacitance measurements for an array of simulated radio frequency (RF) antennas based on a simulated spatial arrangement of the array of simulated RF antennas relative to the digital human face model with the simulated facial expression; providing the simulated capacitance measurements for each simulated facial expression as input training data to a neural network configured to output facial expression parameters based on input capacitance measurements, the input training data labeled with simulated facial expression parameters for the simulated facial expression; and training the neural network to reduce an error between the output facial expression parameters and the simulated facial expression parameters labeling the input training data.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for training a neural network for facial expression recognition, the method comprising:
   recognizing a plurality of digital human face models; and
   for each of the plurality of digital human face models:
      simulating a plurality of simulated facial expressions;
      for each of the plurality of simulated facial expressions, finding simulated capacitance measurements for an array of simulated radio frequency (RF) antennas; and
      providing the simulated capacitance measurements for each simulated facial expression as input training data to a neural network configured to output facial expression parameters based on input capacitance measurements.

2. The method of claim 1, wherein the input training data is labeled with simulated facial expression parameters for the simulated facial expression.

3. The method of claim 2, further comprising training the neural network to reduce an error between the output facial expression parameters and the simulated facial expression parameters labeling the input training data.

4. The method of claim 1, wherein the simulated capacitance measurements are found based on a simulated spatial arrangement of the array of simulated RF antennas relative to the digital human face model with the simulated facial expression.

5. The method of claim 4, wherein finding the simulated capacitance measurements includes calculating the simulated capacitance measurements based at least on simulated interactions between an e-field of the simulated RF antennas and the digital human face model.

6. The method of claim 5, wherein the simulated capacitance measurements are calculated according to Maxwell's equations.

7. The method of claim 4, wherein finding the simulated capacitance measurements includes estimating each simulated capacitance measurement based at least on a length of a ray traced from a simulated RF antenna to a surface of the digital human face model.

8. The method of claim 1, further comprising, for each simulated facial expression, simulating two or more different spatial arrangements for the array of simulated RF antennas relative to the digital human face model.

9. The method of claim 8, wherein the array of simulated RF antennas are integrated into a simulated head-wearable device, and wherein simulating the two or more different spatial arrangements for the array of simulated RF antennas includes simulating two or more different positions of the head-wearable device relative to the digital human face model.

10. The method of claim 1, wherein the plurality of different human face models are generated based at least on a plurality of images of real-world human faces.

11. The method of claim 1, wherein the plurality of simulated facial expressions are each encoded as a plurality of facial expression parameters, and wherein the plurality of simulated facial expressions are a plurality of pre-defined facial expressions each having pre-defined facial expression parameters.

12. The method of claim 1, wherein the plurality of simulated facial expressions are each encoded as a plurality of facial expression parameters, and wherein simulating the plurality of simulated facial expressions includes randomly varying the facial expression parameters for the digital human face model to generate each simulated facial expression.

13. The method of claim 1, wherein each of the plurality of digital human face models differ according to one or more facial shape parameters.

14. The method of claim 13, wherein the one or more facial shape parameters define positions and/or sizes of anatomical facial features of the plurality of digital human face models.

15. The method of claim 1, wherein different neural networks are trained to output facial expression parameters for each digital human face model of the plurality of digital human face models.

16. The method of claim 1, wherein the neural network is configured to output facial expression parameters for two or more digital human face models of the plurality of digital human face models.

17. The method of claim 1, wherein simulations for two or more of the digital human face models are distributed between two or more compute nodes of a distributed computing system.

18. The method of claim 1, wherein simulations for two or more different simulated facial expressions of a digital human face model are distributed between two or more compute nodes of a distributed computing system.

19. A computing system, comprising:
   a communications subsystem;
   a logic subsystem; and
   a storage subsystem holding instructions executable by the logic subsystem to:
      receive, from a plurality of compute nodes via the communications subsystem, simulated capacitance measurements based on a simulated spatial arrangement of an array of simulated radio frequency (RF) antennas relative to a digital human face model with a simulated facial expression; and
      provide the simulated capacitance measurements to a neural network configured to output facial expression parameters based on input capacitance measurements.

20. A method for training a neural network for facial expression modeling, the method comprising:
   recognizing a plurality of digital human face models; and
   for each of the plurality of digital human face models:
      simulating a plurality of simulated facial expressions;
      for each of the plurality of simulated facial expressions, finding simulated capacitance measurements for an array of simulated radio frequency (RF) antennas based on a simulated spatial arrangement of the array of simulated RF antennas relative to the digital human face model with the simulated facial expression;

providing the simulated capacitance measurements for each simulated facial expression as input training data to a neural network configured to output facial expression parameters based on input capacitance measurements, the input training data labeled with simulated facial expression parameters for the simulated facial expression; and training the neural network to reduce an error between the output facial expression parameters and the simulated facial expression parameters labeling the input training data.

* * * * *